(12) United States Patent
Inoue et al.

(10) Patent No.: US 6,879,407 B2
(45) Date of Patent: Apr. 12, 2005

(54) DISPLACEMENT SENSOR

(75) Inventors: Yuichi Inoue, Kyoto (JP); Hiroyuki Inoue, Kyoto (JP); Toshinori Sato, Kyoto (JP)

(73) Assignee: OMRON Corporation, Kyoto (JP)

( * ) Notice: Subject to any disclaimer, the term of this patent is extended or adjusted under 35 U.S.C. 154(b) by 166 days.

(21) Appl. No.: 10/100,280

(22) Filed: Mar. 15, 2002

(65) Prior Publication Data

US 2002/0148983 A1 Oct. 17, 2002

(30) Foreign Application Priority Data

Mar. 23, 2001 (JP) ........................................ 2001-084034

(51) Int. Cl.⁷ .............................................. G01B 11/06
(52) U.S. Cl. ...................................... 356/632; 356/602
(58) Field of Search ................................ 356/602, 623, 356/632, 631; 250/559.27

(56) References Cited

U.S. PATENT DOCUMENTS 5,351,126 A * 9/1994 Takada et al. .............. 356/602

FOREIGN PATENT DOCUMENTS

| JP | 3-30339 | 3/1991 |
|----|---------|--------|
| JP | 4-121132 | 10/1992 |
| JP | 10-173360 | 6/1998 |
| JP | 11-53052 | 2/1999 |

* cited by examiner

*Primary Examiner*—Richard A. Rosenberger
(74) *Attorney, Agent, or Firm*—Beyer Weaver & Thomas LLP

(57) ABSTRACT

A displacement sensor includes a light emitter for emitting light towards a target object, a detector for receiving reflected light from the target object and generating a detection signal which depends on the distance to the target object, a signal processor for calculating the distance to the target object from the detection signal. The signal processor receives from another sensor a data item representing a distance value calculated by the latter and carries out a specified calculation using also the result of calculation with the calculated distance obtained by itself and said calculated distance data item and to output the result of said calculation.

16 Claims, 9 Drawing Sheets

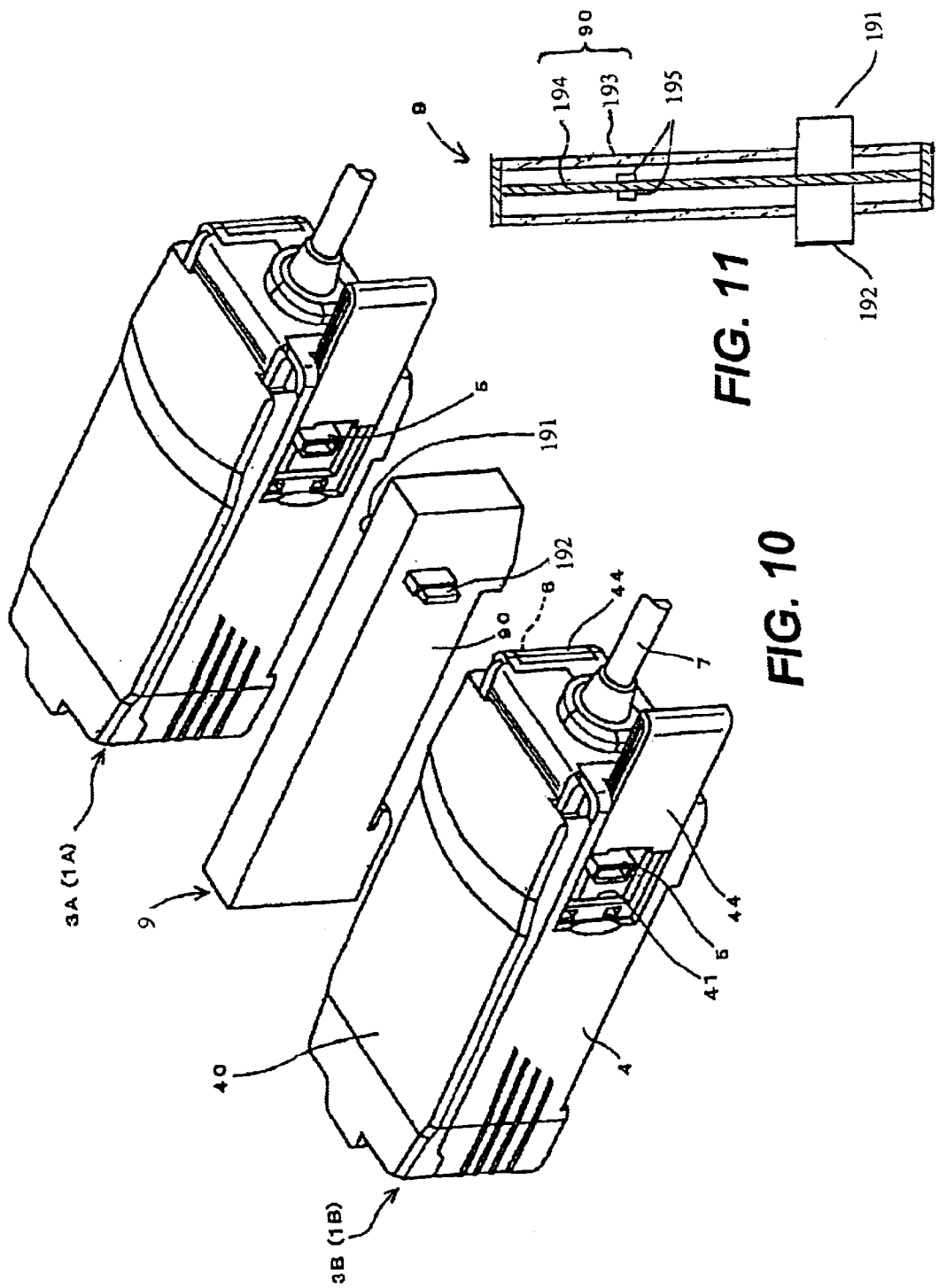

DISPLACEMENT SENSOR

BACKGROUND OF THE INVENTION

This invention relates to a displacement sensor for optically measuring the distance to a target object. More particularly, this invention relates to such a displacement sensor adapted to be used together in combination with another displacement sensor to measure the step height or the thickness of a target object.

FIG. 12 shows a prior art displacement sensor 50 of a type comprised of a detector 60 and a signal processor 70. The detector 60 contains a light emitter 62 and a light receiver 62. The light emitter 62 includes a light source 64 such as a laser diode adapted to emit detection light f driven by a pulse from a driver circuit 63 and a light projecting lens 65 for focusing the detection light f to make incidence onto the target object 80. The light receiver 62 includes a light receiving lens 66 for collecting reflected detection light f from the target object 80 and a one-dimensional position detecting element 67 such as a PSD or a CCD for focusing the light collected by the light receiving lens 66. This position detecting element 67 is adapted to output a detection signal i according to the displacement of the focusing position from a reference position. Since the relationship between the distance to the target object 80 and this displacement is non-linear, the signal processor 70 carries out a correction calculation for correcting this non-linearity.

The signal processor 70 includes a sample-and-hold circuit 71 for receiving the detection signal i from the position detecting element 67 and an A/D converter 72 for converting the signal received from the sample-and-hold circuit 71 to a digital signal. The converted output signal from the A/D converter 72 is received by the CPU 73 of a microcomputer. The CPU 73 carries out processes such as the non-linearity correction referred to above and calculates the distance D to the target object 80. The calculated distance value d is outputted as an analog signal through a D/A converter 74 and an output circuit 75. The CPU 73 also compares the calculated distance value d with a specified threshold value, generates a judgment signal on the basis of this comparison and outputs this judgment signal.

With a displacement sensor thus structured, the distance to a target object can be easily measured, but it cannot easily measure by itself the step height or the thickness of an object. FIG. 13 shows an apparatus combining two displacement sensors 50A and 50B with a calculation controller 51 capable of measuring the step height or the thickness of a target object. For this purpose, the detectors 60A and 60B of the displacement sensors 50A and 50B are positioned at a same height above the target object 80. The detector 60A of the first displacement sensor 50A is positioned above the higher part 81 of the step H and emits detection light thereonto to receive detection light iA. The detector 60B of the second displacement sensor 50B is positioned above the lower part 82 of the step H and emits detection light thereonto to receive detection light iB. Signal processors 70A and 70B respectively of the first and second displacement sensors 50A and 50B calculate the distances D1 and D2 to the higher and lower parts 81 and 82 of the step H. The calculated data d1 and d2 for the distances D1 and D2 are received by the calculation controller 51 which calculates their difference as the step height H and outputs its calculated value h.

FIG. 14 shows the apparatus shown in FIG. 13 being used to measure the thickness of a target object (also indicated by numeral 80). The detectors 60A and 60B of the first and second displacement sensors 50A and 50B are positioned so as to face mutually oppositely, sandwiching the target object 80 in between. The detector 60A of the first displacement sensor 50A projects light to one surface of the target object 80 and the detector 60B of the second displacement sensor 50B projects light to the other surface of the target object 80 to obtain detection signals iA and iB. The signal processors (shown at 70A and 70B in FIG. 13) of the displacement sensors 50A and 50B calculate the distances D1 and D2 to the corresponding surfaces of the target object 80. The calculated data d1 and d2 for these distances D1 and D2 are received by the calculation controller (shown at 51 in FIG. 13) and calculate the thickness T of the target object 80 by subtracting the sum of d1 and d2 from the known distance K between the detectors 60A and 60B. The calculated data for the thickness T is then outputted.

FIG. 15 shows another apparatus capable of measuring the step height and the thickness of a target object as well as the distance thereto, comprising a pair of detectors 60A and 60B and a signal processor 90. This signal processor 90 includes signal processing circuits 91a and 91b which correspond to the signal processors 70A and 70B described above with reference to FIG. 13 and a calculation circuit 92 which corresponds to the calculation controller 51 described above with reference to FIG. 13.

When the step height H of a target object 80 is measured by this apparatus, the signal processing circuits 91a and 91b process the detection signals iA and iB from the detectors 60A and 60B to calculate the distances D1 and D2 to the higher and lower parts 81 and 82 of the step H, and the calculating circuit 92 calculates the difference between the distance data d1 and d2 for the distances D1 and D2 and outputs the difference h.

With apparatus shown in FIGS. 13 and 14, not only the distance to a target object but also step height and thickness of the target object can be measured. On the other hand, since two displacement sensors 50A and 50B and a calculation controller 51 are required, the apparatus is expensive and requires a relatively large space for installation.

The apparatus shown in FIG. 15 is advantageous in that the single signal processor 90 is required for providing the function of receiving detection signals from the pair of detectors 60A and 60B and calculating a distance and the function of calculating the step height and the thickness from two calculated distance data and hence that a large space is not required for its installation. For a user interested only in measuring the distance to a target object, however, the apparatus is unnecessarily expensive, two detectors being not required and the signal processor 90 being provided with unnecessary functions.

SUMMARY OF THE INVENTION

It is therefore an object of this invention in view of the above to provide a relatively inexpensive and compact displacement sensor capable of also measuring step height or thickness of a target object.

It is another object of this invention to provide such a displacement sensor with a signal processor capable of calculating the step height or thickness of a target object as well as the distance thereto.

A displacement sensor embodying this invention, with which the above and other objects can be accomplished, may be characterized as comprising a light emitter for emitting light towards a target object, a detector for receiving reflected light from the target object and generating a detection signal which depends on the distance to the target object, and a signal processor for calculating the distance to the target object from the detection signal, the signal processor serving to receive a calculated distance data item obtained by another sensor, to carry out a specified calculation with the calculated distance obtained by itself and the calculated distance data item and to output the result of this calculation.

The "detector" is placed according to the position of the target object. It may comprise a one-dimensional position detector such as a PSD and a CCD. The "signal processor" need not be placed in any relationship with the position of the target object because its function is to calculate the distance to the target object by processing a detection signal. Thus, the detector and the signal processor are generally separate components and may be connected together by a cord line but nothing prevents them from being integrally formed within a single housing structure.

Various physical quantities may be obtained by the signal processor. One example of such physical quantities is the height of a step on a target object. This may be done by calculating the difference between the calculated distance data item measured by another displacement sensor and the distance value obtained by itself. In such an application, the signal processor corrects the calculated data on the distance to the target object by using a calculated distance data item by the other sensor and the distance calculated by itself by using a standard board having a flat surface or by using a calculated distance data item by the other sensor and the distance calculated by itself by measuring the height of this step on the target object.

Another application is to obtain the thickness of a target object by subtracting from the distance between the other sensor and itself the calculated distance data item obtained by the other sensor and the distance calculated by itself. In such an application, it is preferable to correct the calculated data on the distance to the target object by using the calculated distance data item by the other sensor and the distance calculated by itself by using a standard board having a known thickness.

Thus, the signal processor is adapted to receive calculated distance data (items) from another displacement sensor but the "another sensor" is required only to be able to output such an data item representing the calculated distance ("calculated distance data item"). It is preferable that the signal processor should have both the function of outputting calculated distance data to another displacement sensor and that of receiving calculated distance data from another displacement sensor. If both of these functions are provided also to the other sensor, the two displacement sensors to be connected together become similar and the distinction between a "master" and a "slave" disappears.

What is herein referred to as the calculated distance data may be analog data obtained by processing the output from a position detecting element before they are converted into a distance, digital data after an A/D conversion, or analog or digital data which have been converted to distance.

The signal processor carries out a specified calculation on the basis of a calculated distance data item and a calculated distance obtained by itself. This "specified calculation" is for obtaining the magnitude of the height of a step on the target object or the thickness of the target object. The formula for the calculation is preliminarily set. The physical quantity to be calculated may be other than the step height and the thickness. The degree of surface flatness, for example, can be measured by placing a plurality of such displacement sensors above the target object and measuring the distances from them to the target surface of the object.

The displacement sensor may preferably be provided with a display device for indicating that calculations of the kind explained above are being carried out. A digital display device is preferable for displaying results of measurement or a formula to be used but this is not intended to limit the scope of the invention.

A displacement sensor according to this invention may be used singly to measure the distance to a target object. When the height of a step on the surface of a target object or the thickness of a target object is to be measured, another displacement sensor capable at least of outputting calculated distance data is used in combination.

When displacement sensors as described are used singly, they are convenient because there are no externally protruding components. Since there is no distinction between a master and a slave, as explained above, the user is not required to make a selection when making a purchase. When two or more of them are used together, they can be combined freely. From the point of view of a seller, it is convenient because sensors of only one kind need to be stocked.

When two or more of these displacement sensors are used in combination, a connector unit of this invention may be used between a pair of them. A connector unit according to this invention may be characterized as comprising a base plate having mutually oppositely facing surfaces and two connector pieces which are electrically connected to each other and supported by the base plate, each protruding from a corresponding surface of the base plate, one of the connector pieces being electrically connected to one of the connectors of one of the displacement sensors, the other of the connector pieces being electrically connected to one of the connectors of the other displacement sensor.

DESCRIPTION OF THE DRAWINGS

FIG. 10 is an exploded diagonal view of a displacement sensing device with two displacement sensors connected with a connector unit.

FIG. 11 is a sectional view of the connector unit of FIG. 10.

DETAILED DESCRIPTION OF THE INVENTION

Figure 1:
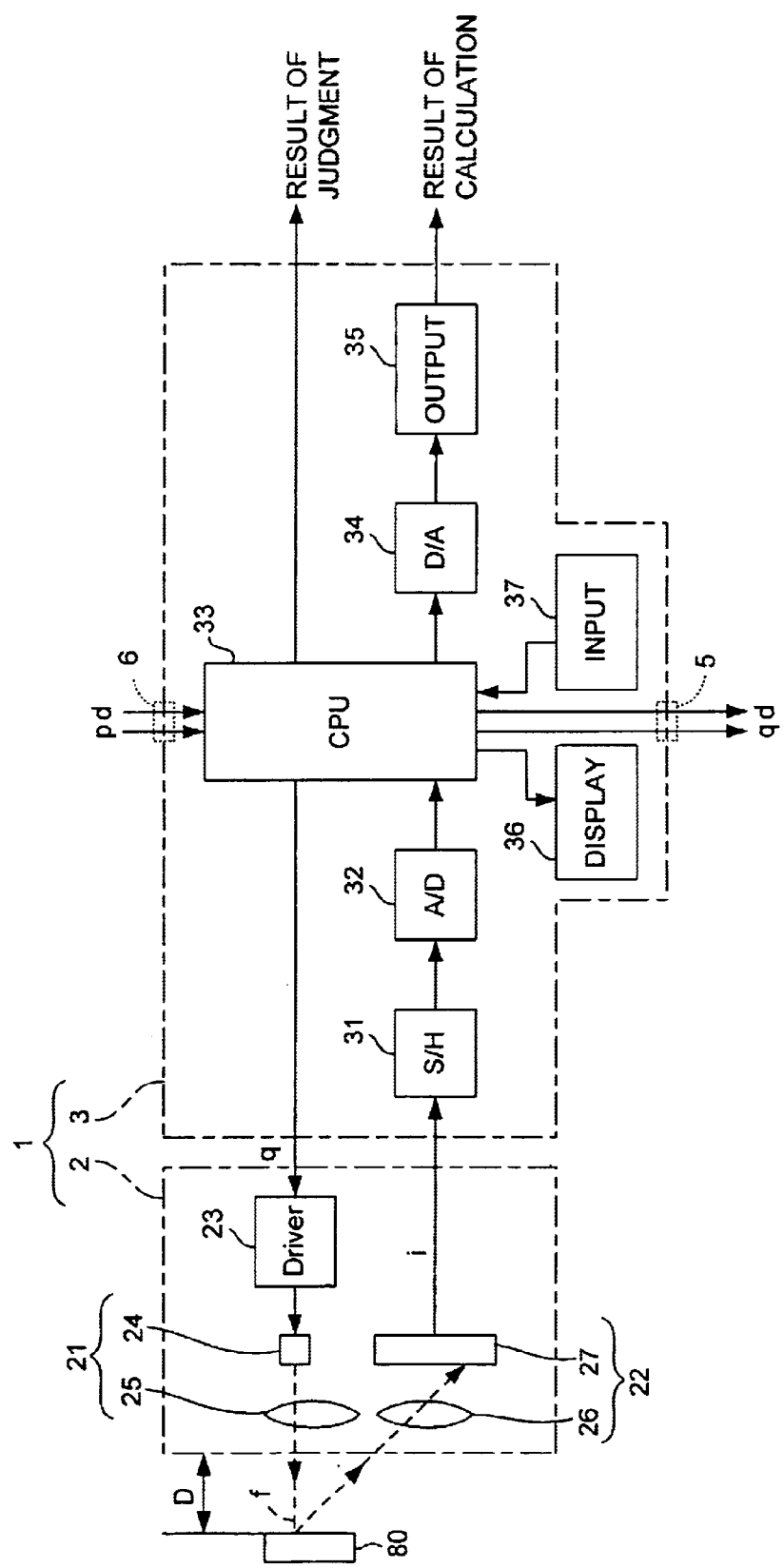
FIG. 1 is a block diagram of a displacement sensor embodying this invention.
Figure 12:
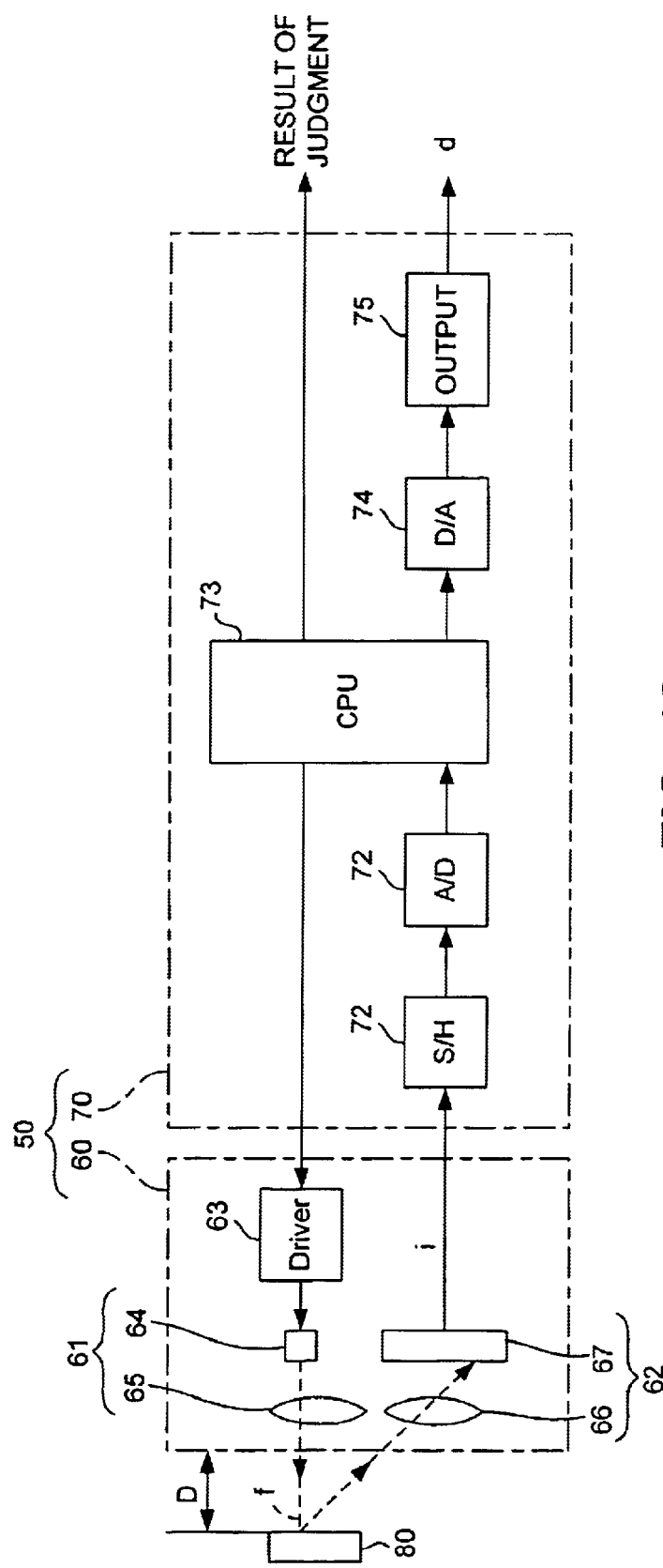
FIG. 12 is a block diagram of a prior art displacement sensor.
Figures 13, 14:
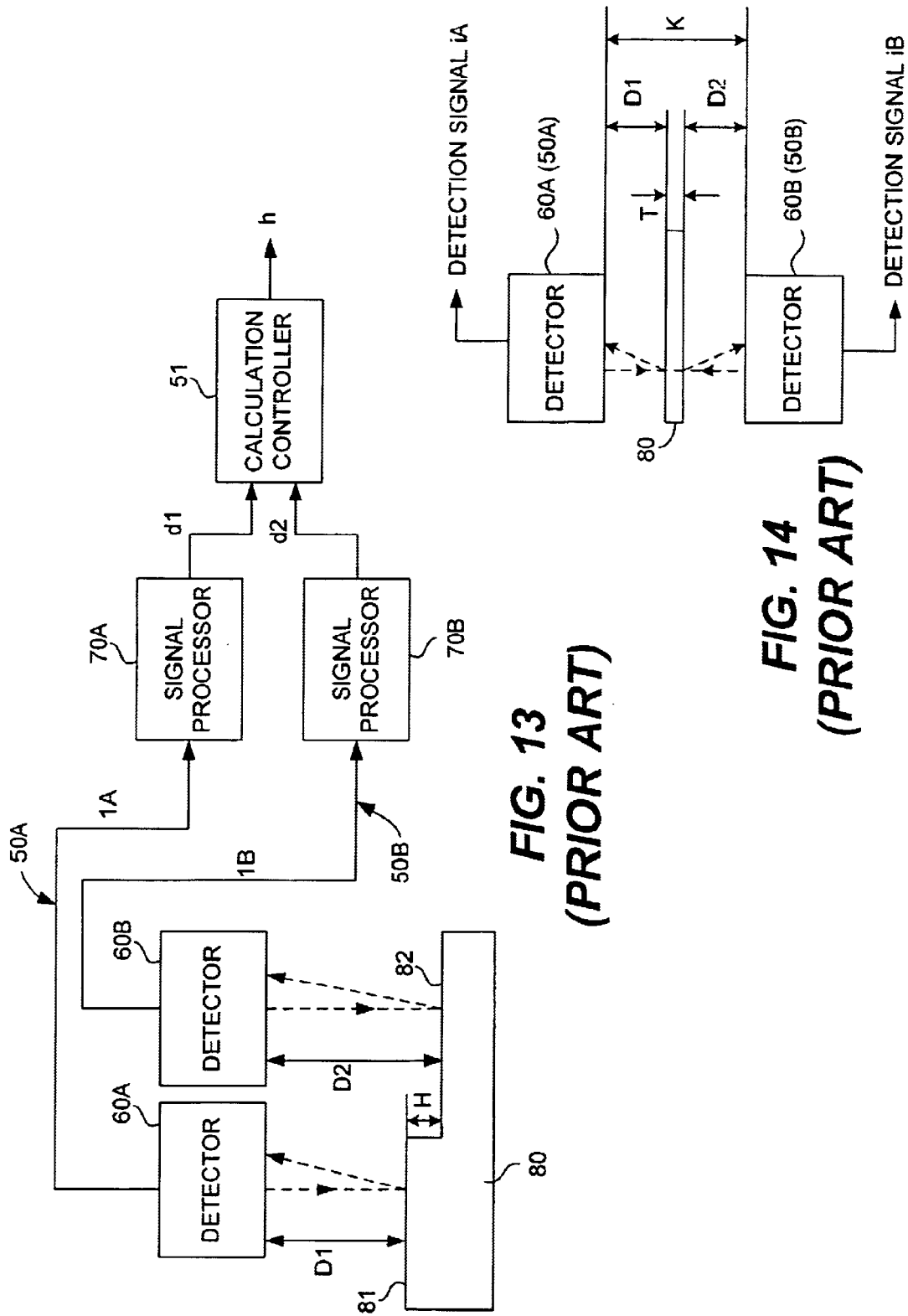
FIG. 13 is a block diagram for showing a prior art method of using two displacement sensors to measure the height of a step on an object.
FIG. 14 is a block diagram for showing a prior art method of using two displacement sensors to measure the thickness of an object.
Figure 15:
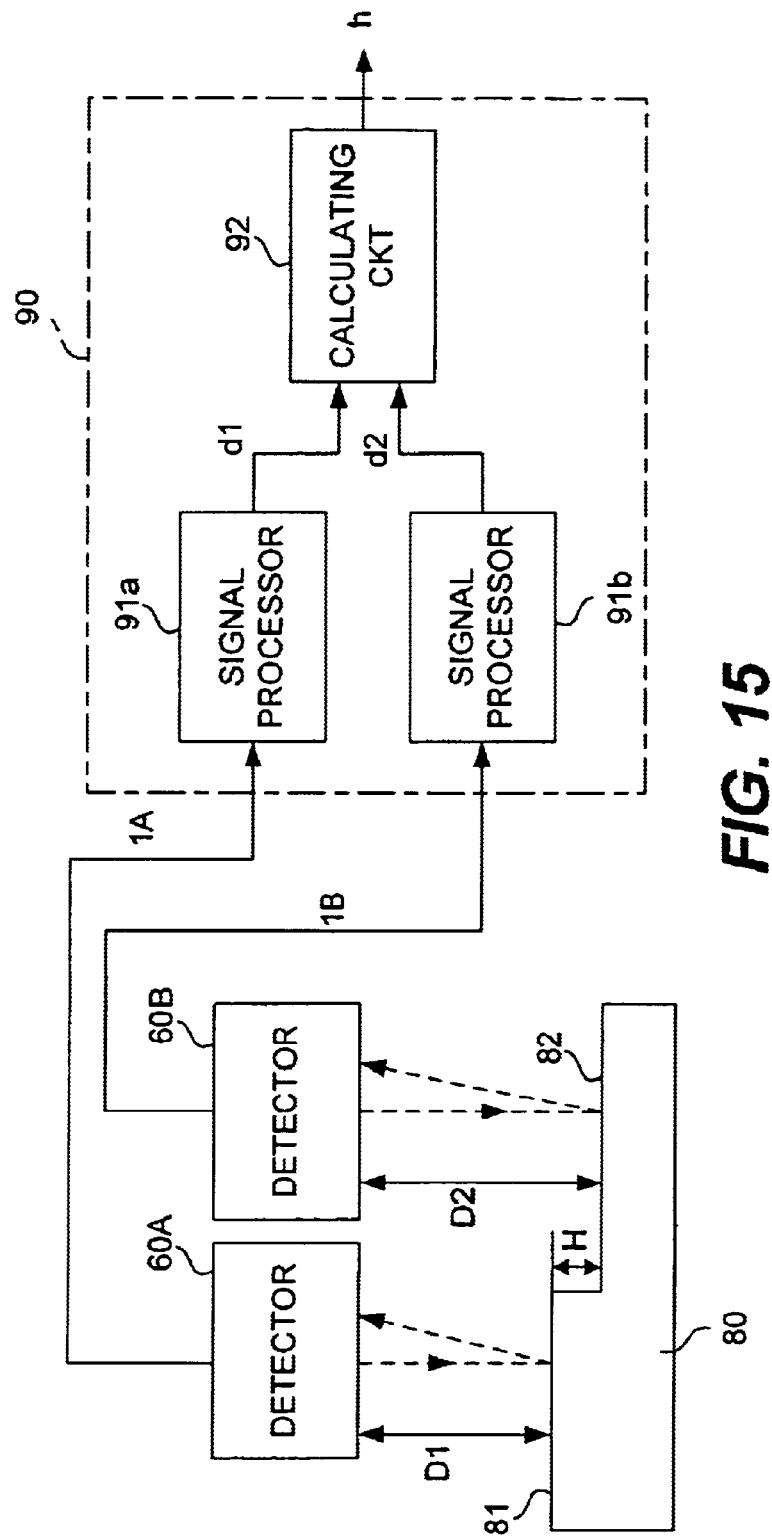
FIG. 15 is a block diagram of a prior art device for measuring the height of a step on an object.

FIG. 1 shows a displacement sensor 1 embodying this invention, comprising a detector 2 and a signal processor 3. The detector 2 and the signal processor 3 are separate components and are electrically connected to each other by a cable. The detector 2 is comprised of a light emitting optical system ("light emitter") 21 including a driver circuit 23, a light source 24 and a light projecting lens 25 and a light receiving optical system ("light receiver") 22 including a light receiving lens 26 and a position detecting element 27. The light source 24 of the light emitter 21 generates detection light f by a pulse signal from the driver circuit 23. The structure of the detector 2 is the same as explained above with reference to FIG. 12.

The signal processor 3 includes a sample-and-hold circuit (S/H) 31, an A/D converter 32, a CPU 33, a D/A converter 34, an output circuit 35, a display device 36 and an input device 37. The display device 36 is used for displaying calculated data such as the step height and thickness of a target object and a formula. The input device 37 is used for setting threshold values or the like. The CPU 33 processes the detection signal i received from the detector 2 and calculates the distance D to a target object 80. The calculated data item d for the distance D is converted into an analog signal and outputted from the output device 35. The CPU 33 also compares the calculated data item d with a specified threshold value set through the input device 37. If the calculated data item d is greater than the threshold value, judgment result signal "1" indicating "far", for example, is outputted. If the calculated data item d is smaller than the threshold value, judgment result signal "0" indicating "near" is outputted.

In addition to the aforementioned functions of the prior art technology, the CPU 33 is further provided with the function of outputting the calculated data item d for distance obtained by itself to the signal processor of another displacement sensor and the function of calculating the step height or thickness of a target object from a calculated distance data item received from the signal processor of another displacement sensor and a calculated data item obtained by itself and outputting the result of such calculation. The CPU 33 is further provided with the function of receiving from another displacement sensor a timing signal p corresponding to the timing of the light emission from this other sensor, the function of generating another timing signal q corresponding to a different timing and the function of outputting such a timing signal generated by itself to the detector 2 or to another displacement sensor.

Figure 2:
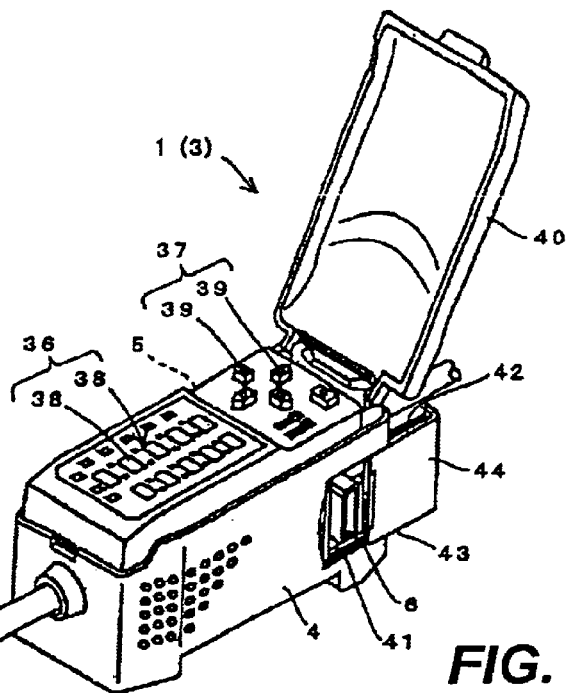
FIG. 2 is an external diagonal view of the signal processor shown in FIG. 1.

FIG. 2 shows an external view of the signal processor 3 of the displacement sensor 1, comprising a housing 4 and a baseboard (not shown) on which are mounted the various circuits described above. A plurality of display units 38 comprising the aforementioned display device 36 and a plurality of push buttons 39 comprising the aforementioned input device 37 are disposed on the upper surface of the housing 4. A lid 40 which may be opened or closed covers the display device 36 and the input device 37. A cord line 7 extends from a side surface of the housing 4, and a connector 8 is attached to the opposite end of this cord line 7 for an electrical connection.

On both side surfaces of the housing 4 are openings 41 for connectors 5 and 6 for signal transmission. Each opening 41 is provided with an openable door 44 for preventing dust particles from entering. Guide grooves 42 and 43 are provided on upper and lower parts of each opening 41 such that the door 44 can slide therealong with its top and bottom edges engaged therewith. The door 44 is formed so as not to be removable from the housing 4 such that it will not be misplaced or lost.

One of the connectors (say, 5) is electrically connected to the signal processor of another displacement sensor for receiving and taking into the CPU 33 calculated distance data item d obtained by the signal processor of this other displacement sensor and the timing signal p corresponding to the light projection timing from this other sensor. The other connector (say, 6) is electrically connected to the signal processor for the other displacement sensor for outputting to the latter calculated distance data item d obtained by itself and a timing signal q generated by itself.

Figure 3:
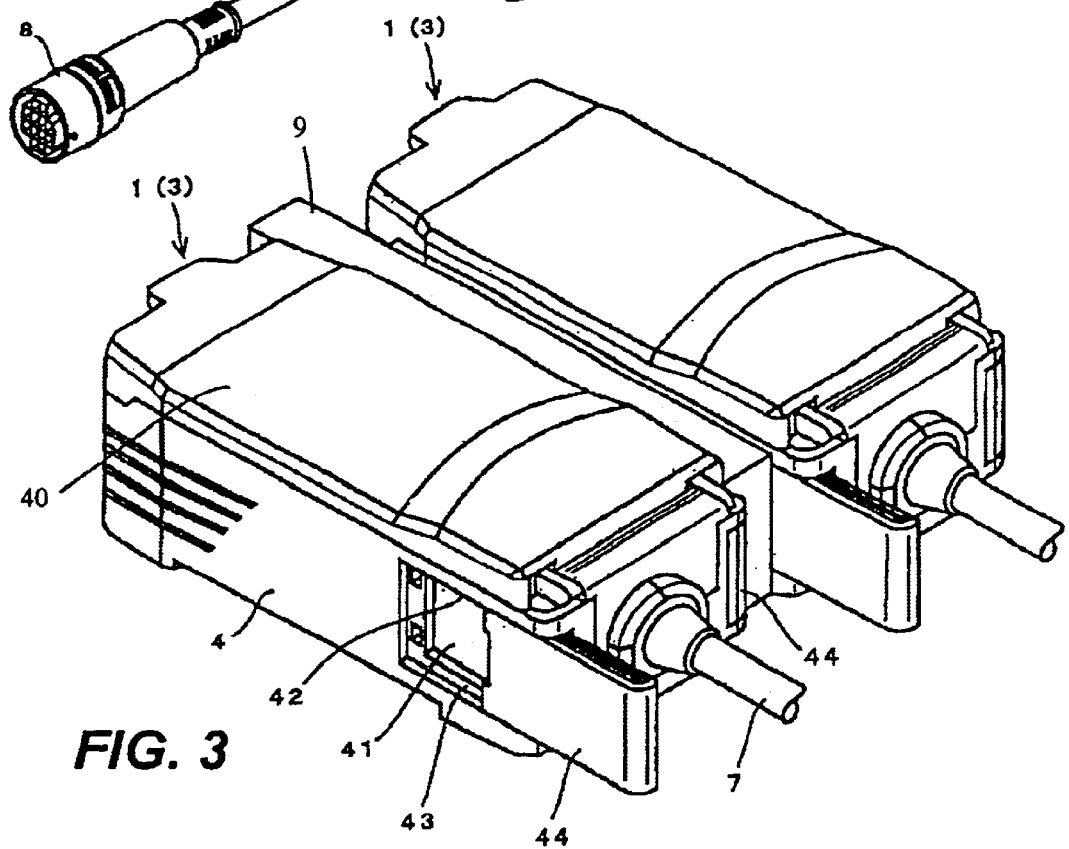
FIG. 3 is an external diagonal view of two signal processors connected to each other.
Figure 4:
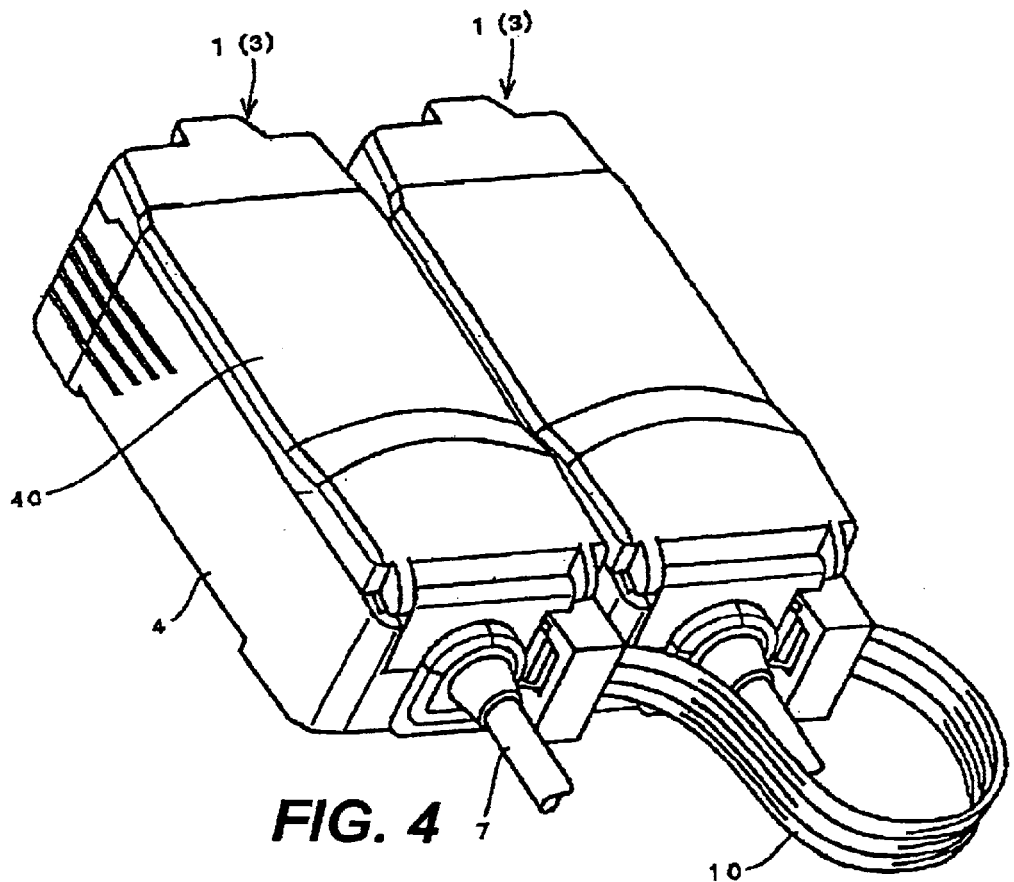
FIG. 4 is an external diagonal view of two signal processors connected to each other in another manner.

Such connection of the signal processors of two displacement sensors may be effected as shown in FIG. 3 by inserting a planar connector unit 9 in between such that the two displacement sensors become structurally united. Although not visible in FIG. 3, a pair of mutually connected connector pieces protrude in mutually opposite directions from the connector unit 9, connected to the connectors 5 and 6 of the neighboring displacement sensors. Alternatively, the two displacement sensors may be electrically connected as shown in FIG. 4 by means of a cable 10.

Figure 5:
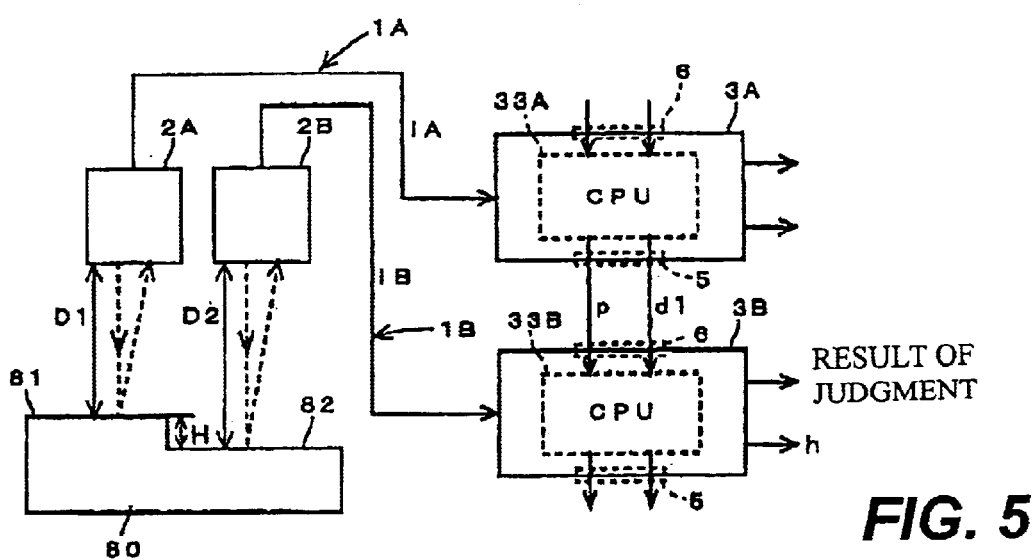
FIG. 5 is a block diagram of two signal processors which are connected to each other according to this invention to measure a step height of a target object.

FIG. 5 show a process of measuring a step height H of a target object by means of two displacement sensors 1A and 1B. The detectors 2A and 2B of the two displacement sensors 1A and 1B are set at a same height above the target object 80. The detector 2A of one of the displacement sensors (1A) emits light to a higher position 81 of the target object 80 and the detector 2B of the other of the displacement sensors (1B) emits light to a lower position 82 of the target object 80. As detection signals iA and iB are thereby received, CPUs 33A and 33B of signal processors 3A and 3B of the displacement sensors 1A and 1B calculate the distances D1 and D2 from the corresponding detectors 2A and 2B to the higher and lower parts 81 and 82 of the target object 80.

Since the connector 5 of the first displacement sensor 1A is electrically connected to the connector 6 of the second displacement sensor 1B, the calculated distance data item d1 for the distance D1 obtained by the CPU 33A and a timing signal p corresponding to the light emission from the corresponding displacement sensor (1A) are both received by the CPU 33B of the other (second) displacement sensor 1B.

Figure 6:
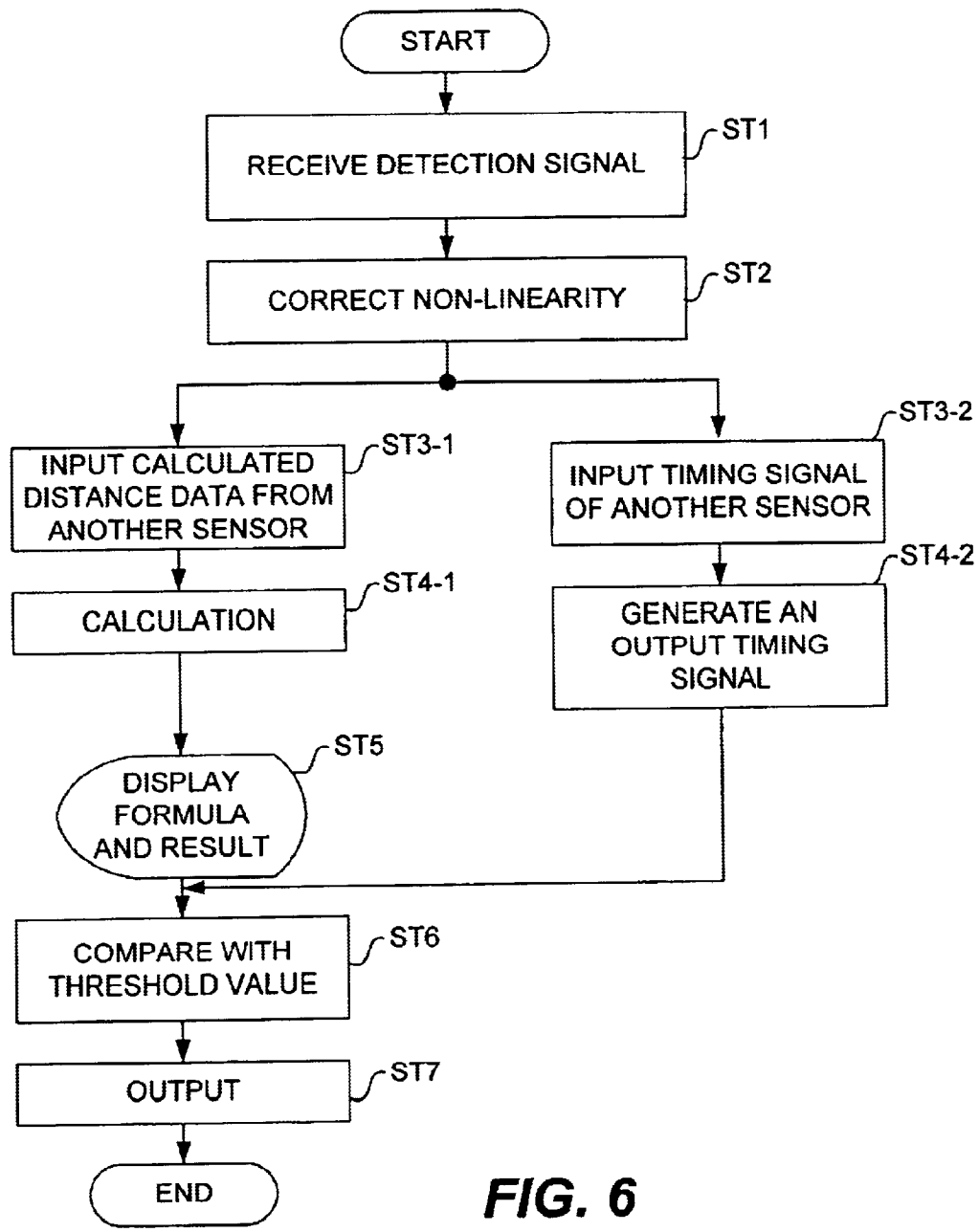
FIG. 6 is a flowchart of control by a CPU when two displacement sensors are connected.

FIG. 6 shows the control by the CPU 33B of the second displacement sensor 1B. First, the CPU 33B receives the detection signal iB from the associated detector 2B through the sample-and-hold circuit and the A/D converter associated therewith (Step ST1) and carries out a specified processing such as non-linearity correction as explained above to calculate the distance D2 to the target object 80 (Step ST2). Next, the calculated data item d1 for the distance D1 obtained by the CPU 33A of the first displacement sensor 1A is received (Step ST3-1). Concurrently, a timing signal p corresponding to the timing of light emission from the first displacement sensor 1A is received (Step ST3-2).

Figure 7:
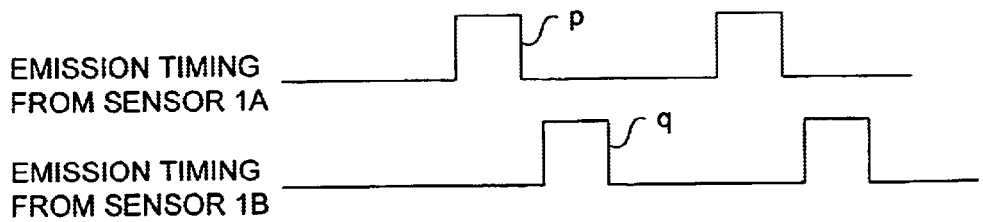
FIG. 7 is a timing chart for showing the timing of light projection from two sensors.

Next, the CPU 33B subtracts the data item d1 received from the first displacement sensor 1A from the distance data item d2 for the distance D2 calculated by itself to calculate the step height H (Step ST4-1). Concurrently, another timing signal q corresponding to a different timing from the received timing signal p is generated and outputted to the detector 2B (Step ST4-2). FIG. 7 shows the relationship between the timing signal p from the first displacement sensor 1A taken in by the CPU 33B and the timing signal q generated by itself. They are different so as to avoid interference between them.

Next, the CPU 33B causes the calculated data item h for the step height H and the formula for its calculation on the display device 36 (Step ST5). The calculated height data item h is compared with a threshold value set through the input device 37 (Step ST6) and the result of the comparison indicating whether the step is small or large is outputted together with the data item h itself (Step ST7).

In the above, it is preferable to carry out a "teaching" routine as shown below before measurements are taken.

For example, the detectors 2A and 2B of two displacement sensors 1A and 1B are placed above a standard baseboard having a horizontal flat surface and thereafter these two displacement sensors 1A and 1B are used to measure the distances to the surface of the baseboard. The calculated data $d_{01}$ and $d_{02}$ are stored in the signal processor 3B of the second sensor 1B. If these two calculated values do not match, their difference is regarded as representing the error in positioning the two detectors 2A and 2B. When the signal processor 3B of the second displacement sensor 1B is used to measure the step height H, the calculated data d1 and d2 for the distance to the target object 80 or the calculated data item h for the step height H is corrected by this error.

It goes without saying that the "teaching" may be carried out in many different ways. It may be carried out, for example, by using a standard stepped board having a step with a known height. In this case, two displacement sensors are used similarly to measure the distances to the higher and lower parts of the baseboard and the step height is calculated from the calculated data for these distances. The difference between these calculated data and the real height of the step is used to correct the calculated value for the measured step height.

Figure 8:
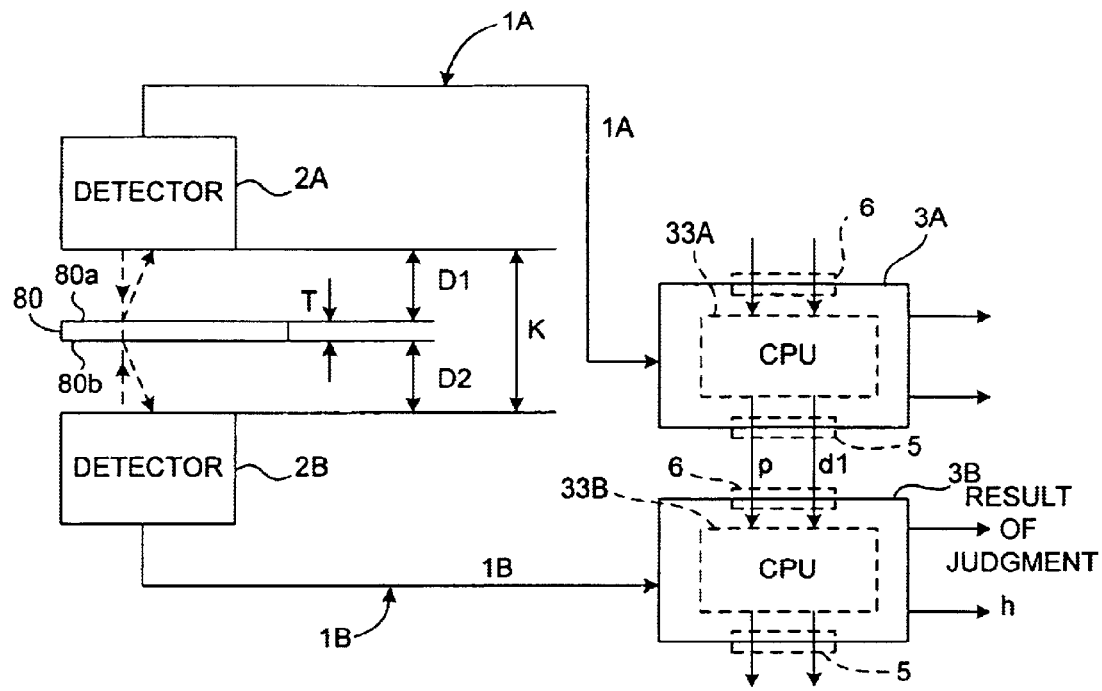
FIG. 8 is a block diagram of two signal processors which are connected to each other to measure the thickness of a target object.
Figure 9:
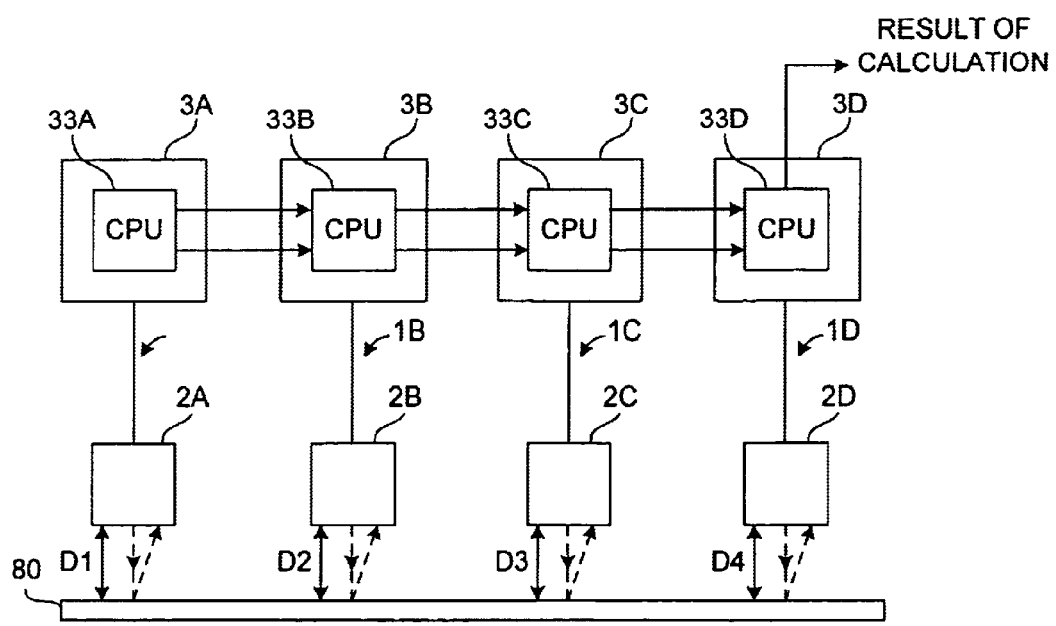
FIG. 9 is a block diagram of a displacement sensing device embodying this invention with a plurality of displacement sensors connected in stages.

In the example described above, two displacement sensors 1A and 1B were used to measure the step height of a target object 80 but two displacement sensors 1A and 1B may be used to measure also the thickness of a target object 80 as shown in FIG. 8. It is also possible to connect the signal processors 3A–3D of more than two displacement sensors 1A–1D as shown in FIG. 9 to obtain the average, maximum and minimum of distances D1–D4 from their detectors 2A–2D to a target object 80.

To explain more in detail the method of measurement shown in FIG. 8, the detectors 2A and 2B of two displacement sensors 1A and 1B are placed opposite to each other with a target object 80 inserted therebetween. The detector 2A of the first displacement sensor 1A projects light to one surface 80a of the target object 80 and the detector 2B of the second displacement sensor 2B projects light to the opposite surface 80b of the target object 80 to obtain detection signals iA and iB. The CPUs 33A and 33B of the signal processors 3A and 3B of the displacement sensors 1A and 1B calculate the distances D1 and D2 to the surfaces 80a and 80b of the target object 80. The signal processors 3A and 3B of the two displacement sensors 1A and 1B may be connected as shown in FIG. 5 and the routine for the control by the CPU 3B of the second displacement sensor 1B is the same as shown in FIG. 6 except the formula for the calculation is different. In this example, too, it is preferable to carry out a kind of teaching routine described above. For example, the two displacement sensors 1A and 1B may be used preliminarily to measure the thickness of a standard plate with a known thickness in the same manner as described above, and the difference between the calculated thickness and the true thickness is used to correct the calculated thickness of the target object 80.

FIG. 10 shows more in detail how the two signal processors 3A and 3B of the two sensors 1A and 1B may be connected both mechanically and electrically with the planar connector unit 9 inserted in between. Numerals 191 and 192 indicate a pair of connector pieces which are mutually connected to each other, protruding in mutually opposite directions away from the connector unit 9. They protrude such that each can be inserted into the opening 41 formed in the corresponding one of the sensors 1A or 1B, such that connector piece 191 can be connected to the connector 5 of the sensor 1A and that connector piece 192 can be connected to the connector 6 of the sensor 1B. The connector unit 9 is comprised of a supporting structure 90 comprised of a hollow planar member 193 having a base plate 194 buried inside for supporting the connector pieces 191 and 192 on its both surfaces such that the tips of these connector pieces 191 and 192 protrude outward from the outer surfaces of the hollow member 193. This hollow member 193 may at least in part comprise a transparent synthetic resin material and a light emitting element such as an LED 195 may be placed inside so as to become lit when the connector pieces 191 and 192 are successfully connected to the connectors 5 and 6 of the sensors 1A and 1B.

What is claimed is:

1. A displacement sensor comprising:
    a light emitter for emitting light towards a target object;
    a detector for receiving reflected light from said target object and generating a detection signal which depends on the distance to said target object; and
    a signal processor including an output device for calculating the distance to said target object from said detection signal, said signal processor serving to receive a calculated distance data item obtained by another sensor, to carry out a specified calculation with the calculated distance obtained by itself and said calculated distance data item and to output the result of said calculation through said output device to a different signal processor of another displacement sensor.

2. The displacement sensor of claim 1 wherein said signal processor calculates the height of a step on said target object by calculating the difference between the distance calculated by itself and said calculated distance data item on the distance to said step.

3. The displacement sensor of claim 2 wherein said signal processor corrects said calculated data on the distance to said target object by using a calculated distance data item by said another sensor and calculated distance by itself by using a standard board having a flat surface.

4. The displacement sensor of claim 2 wherein said signal processor corrects said calculated data on the distance to said target object by using a calculated distance data item by said another sensor and calculated distance by itself by measuring the height of said step on said target object.

5. The displacement sensor of claim 2 wherein said target object has a first surface and a second surface which face opposite to each other, wherein said another sensor faces opposite to itself with said target object placed in between, and wherein said signal processor calculates thickness of said target object by subtracting from the distance between said another sensor and itself the calculated distance data item obtained by said another sensor and the calculated distance obtained by itself.

6. The displacement sensor of claim 5 wherein said signal processor corrects said calculated data on the distance to said target object by using a calculated distance data item by said another sensor and calculated distance by itself by using a standard board having a known thickness.

7. The displacement sensor of claim 5 wherein said signal processor receives a timing signal corresponding to the timing of light emission from another displacement sensor, generates another timing signal of another timing different from said received timing and outputs said generated another timing signal to said detector.

8. The displacement sensor of claim 2 wherein said signal processor receives a timing signal corresponding to the timing of light emission from another displacement sensor, generates another timing signal of another timing different from said received timing and outputs said generated another timing signal to said detector.

9. The displacement sensor of claim 1 wherein said signal processor receives a timing signal corresponding to the timing of light emission from another displacement sensor, generates another timing signal of another timing different from said received timing and outputs said generated another timing signal to said detector.

10. The displacement sensor of claim 1 wherein said signal processor includes a display device which displays that a specified calculation is being carried out.

11. The displacement sensor of claim 1 further comprising:
   a housing containing therein said light emitter, said detector and said signal processor, said housing having openings on different surfaces of said housing;
   a first connector for transmitting signals to another displacement sensor;
   a second connector for receiving signals from another displacement sensor, tips of said first and second connectors abutting said openings without protruding outward therethrough; and
   openable doors which cover said openings;
   said signal processor serving to transmit said calculated distance through said first connector to said another displacement sensor and to receive calculated distance data item from said another displacement sensor through said second connector.

12. The displacement sensor of claim 11 wherein said first connector and said second connector each serve to transmit at least one selected from the group consisting of said calculated distance data item and a timing signal which determines the timing of light emission from said light emitter.

13. The displacement sensor of claim 11 further comprising a connector unit having a planar member with mutually oppositely facing surfaces, said connector unit having a first connector piece and a second connector piece supported by said planar member and protruding in mutually opposite directions respectively from said mutually oppositely facing surfaces of said planar member, each of said connector pieces adapted to be inserted to either of said openings, said first connector piece being electrically connected to said first connector, said second connector piece being electrically connected to a connector of said another displacement sensor.

14. The displacement sensor of claim 13 wherein said planar member of said connector unit is hollow, containing therein a base plate, said connector pieces being supported by said plate and protruding outward from said planar member.

15. The displacement sensor of claim 14 wherein said hollow planar member comprises at least in part a transparent material, having a light emitting element, said light emitting element emitting light when each one of the connector elements is electrically connected to a corresponding one of said connectors of said displacement sensor.

16. A displacement sensing device comprising:
   two displacement sensors consisting of a first displacement sensor and a second displacement sensor, each adapted to optically measure the distance to a target object; and
   a connector unit for electrically connecting said two displacement sensors;
   each of said displacement sensors comprising:
   a first connector for transmitting signals to the other of said displacement sensors;
   a second connector for receiving signals transmitted from the other displacement sensor;
   a housing containing therein said first connector and said second connector and having openings on mutually opposite sides thereof, said first connector and said second connector being each positioned at a corresponding one of said openings without protruding therethrough;
   an output device for outputting a calculated distance to a different signal processor of another displacement sensing device; and
   openable doors each closing a corresponding one of said opening;
   said connector unit comprising:
   a base plate having mutually oppositely facing surfaces; and
   two connector pieces which are mutually electrically connected and supported by said base plate, each protruding from a corresponding one of said surfaces of said base plate, one of said connector pieces being electrically connected to said first connector of said first displacement sensor, the other of said connector pieces being electrically connected to said second connector of said second displacement sensor.

* * * * *